US011645394B2

(12) United States Patent
Boyapalle et al.

(10) Patent No.: US 11,645,394 B2
(45) Date of Patent: May 9, 2023

(54) SYSTEMS AND METHODS FOR ASSOCIATING ATTESTED INFORMATION HANDLING SYSTEMS TO END USER ACCOUNTS

(71) Applicant: DELL PRODUCTS L.P., Round Rock, TX (US)

(72) Inventors: Anantha K. Boyapalle, Cedar Park, TX (US); Charles D. Robison, Buford, GA (US); Vaibhav Soni, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/354,654

(22) Filed: Jun. 22, 2021

(65) Prior Publication Data

US 2022/0405394 A1    Dec. 22, 2022

(51) Int. Cl.
*G06F 21/57*       (2013.01)
*G06F 9/4401*     (2018.01)
(Continued)

(52) U.S. Cl.
CPC .......... *G06F 21/575* (2013.01); *G06F 9/4406* (2013.01); *G06F 21/31* (2013.01); *G06F 21/73* (2013.01); *G06F 2221/034* (2013.01)

(58) Field of Classification Search
CPC ...... G06F 21/575; G06F 9/4406; G06F 21/31; G06F 21/73; G06F 2221/034; G06F 21/57; G06F 9/4401
See application file for complete search history.

(56) References Cited

U.S. PATENT DOCUMENTS

| 2013/0019237 A1* | 1/2013 | Pardehpoosh ..... G06Q 30/0609 717/176 |
| 2014/0101467 A1* | 4/2014 | Jubran ................. H04L 41/344 709/224 |
| 2021/0334111 A1 | 10/2021 | Limonciello et al. |

OTHER PUBLICATIONS

Phelps et al., "Dell Technologies Supply Chain Security: Secured Component Verificdtion for PowerEdge", Dell Technologies, 2020, 3 pgs.

(Continued)

*Primary Examiner* — Quazi Farooqui
(74) *Attorney, Agent, or Firm* — Egan, Enders & Huston LLP.

(57) ABSTRACT

Systems and methods are provided that may be implemented to provide a hardware-rooted, protected, and operating system (OS)-agnostic environment in which designated logic (e.g., one or more software and/or firmware tools such as an OS agent) may be run to verify the ownership and/or registration of a given information handling system before the OS is booted and running, and therefore before system data (e.g., user data) is exposed. In one exemplary embodiment, the designated logic may include a unified extensible firmware interface (UEFI) driver that is protected (e.g., signed), and that runs during the system boot sequence before the OS is booted. The disclosed systems and methods may be advantageously implemented in one embodiment to allow a system user who purchases and acquires a given information handling system from a source and/or channel other than the original system manufacturer to register and/or associate the given information handling system with their manufacturer-assigned user account.

23 Claims, 3 Drawing Sheets

(51) Int. Cl.
G06F 21/31 (2013.01)
G06F 21/73 (2013.01)

(56) References Cited

OTHER PUBLICATIONS

Microsoft Docs, Hardware Inventory, "Introduction to Hardware Inventor in Configuration Manager", May 2019, 2 pgs.
Hunt et al., "The Seven Properties of Highly Secured Devices (2nd Edition)", Microsoft Azure Sphere Team, Obtained from Internet on May 4, 2021, 15 pgs.
UEFI Shell Specification, Rev. 2.2, Jan. 2016, 258 pgs.

* cited by examiner

SYSTEMS AND METHODS FOR ASSOCIATING ATTESTED INFORMATION HANDLING SYSTEMS TO END USER ACCOUNTS

FIELD

This application relates to operating systems of information handling systems and, more particularly, to associating information handling systems to end user accounts.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system product registration is an important step that allows a human user to take ownership of a given information handling system, to ensure that the warranty for the given information handling system is connected to the user, and to ensure entitlements for licenses, services and contracts persist for the user regardless of the state of the given information handling system. Product registration can be very difficult for users because anchoring trust from an information handling system to an account is difficult to do in a secure, automatic and resilient manner.

As a pre-condition for product registration of a given information handling system, the manufacturer of a given information handling system sometimes requires a current system user to write the current date on a sticky note, stick it to a surface of the given information handling system chassis next to the system service tag that includes the system serial number in plain text format, and to take a picture showing the sticky note and the service tag in within the same picture. The current system user is then required to text or email an electronic copy of the picture to a system manufacturer service center to prove to the system manufacturer that the current system user has physical possession of the given information handling system. Dell Smart ID is one example of such a service that is available from Dell Technologies Inc., of Round Rock, Tex., and that has been employed to verify to a tech support phone technician that a system user actually has a given information handling system in their possession in the above-described manner. This Dell Smart ID service employs a methodology that applies to both "smart and "dumb" devices, including monitors and other peripherals alike.

However, a new user who purchased a given information handling system from a channel partner or other third party will not own the licenses tied to software entitlements and provisioning. If such a new system user logs into the system manufacturer's support site, it will only show the devices and licenses that the user directly purchased from the manufacturer. The system manufacturer has no efficient way of identifying the devices that the user procured through other means thereby making it extremely difficult to provide warranty and support. There have been instances of fraud where a system user who is not the original system owner has assumed possession of a given information handling system, and then claims a replacement warranty and other services through the system manufacturer, causing financial damages to the manufacturer. Thus, in some cases, proper product registration is difficult to achieve, and existing product registration schemes provide opportunity for fraud in such cases.

One example of a conventional method that has been employed to verify that a new system user has validly taken possession of a given information handling system requires that the previous registered system user of the given information handling system log onto the system manufacturer's website to confirm transfer of the given information handling system to the new system user. In this method, the system manufacturer "bricks" the given information handling system if this step is not performed by the previous registered user.

Digital Device Identity Secured Component Verification is a technique that creates an integrity protected manifest of a given information handling system and its components.

SUMMARY OF THE INVENTION

Systems and methods are disclosed herein that may be implemented to provide a hardware-rooted, protected, and operating system (OS)-agnostic environment in which designated logic (e.g., one or more software and/or firmware tools such as an OS agent) may be run to verify the ownership and/or registration of a given information handling system before the OS is booted and running, and therefore before system data (e.g., user data) is exposed. In one exemplary embodiment, the designated logic may include a unified extensible firmware interface (UEFI) driver that is protected (e.g., signed), and that runs during the system boot sequence before the OS is booted. The disclosed systems and methods may be advantageously implemented in one embodiment to allow a system user who purchases and acquires a given information handling system from a source and/or channel other than the original system manufacturer to register and/or otherwise associate the given information handling system with their manufacturer-assigned user account.

Examples of features that may be achieved, alone or in combination, with the implementation of the disclosed systems and methods include, but are not limited to, provide a persistent account provisioning mechanism for user devices (e.g., information handling systems), verification of device integrity and end user physical presence for connecting to an end user's support account, protecting an information handling system manufacturer from fraudulent support requests, etc. Examples of other additional features that may be implemented include, for example, using a Trusted Computing Group (TCG) platform certificate in a way that allows control and trust of system manufacturer factory data to build a foundation upon which all system device identities are anchored, and in a way that facilitates management of individual information handling systems and their respective entitlements.

In one respect, disclosed herein is a method, including performing the following designated sequence upon power on or restart of at least one programmable integrated circuit of a local information handling system and before booting an operating system (OS) for the local information handling system: creating an inventory of hardware components that are currently installed as part of the local information handling system; comparing the created inventory of hardware components of the local information handling system to a list of original manufacturer-installed hardware components for the local information handling system that is previously stored on non-volatile memory (NVM) of the local information handling system; and then only one of: booting the OS of the local information handling system and providing a unique identifier (UID) of the local information handling system across a network to a remote information handling system if the created inventory of hardware components is the same as the list of original manufacturer-installed hardware components, or booting the OS of the local information handling system without providing the UID of the local information handling system across the network to the remote information handling system if the created inventory of hardware components of the local information handling system is not the same as the list of original manufacturer-installed hardware components for the local information handling system.

In another respect, disclosed herein is a local information handling system, including: at least one programmable integrated circuit; and non-volatile memory coupled to the programmable integrated circuit. The at least one programmable integrated circuit may be programmed to perform the following designated sequence upon power on or restart of the at least one programmable integrated circuit and before booting an operating system (OS) for the local information handling system: create an inventory of hardware components that are currently installed as part of the local information handling system, compare the created inventory of hardware components of the local information handling system to a list of original manufacturer-installed hardware components for the local information handling system that is previously stored on the NVM of the local information handling system, and then only one of: boot the OS of the local information handling system and providing a unique identifier (UID) of the local information handling system across a network to a remote information handling system if the created inventory of hardware components is the same as the list of original manufacturer-installed hardware components, or boot the OS of the local information handling system without providing the UID of the local information handling system across the network to the remote information handling system if the created inventory of hardware components of the local information handling system is not the same as the list of original manufacturer-installed hardware components for the local information handling system.

In another respect, disclosed herein is a system including a local information handling system, the local information handling system including: at least one programmable integrated circuit; and non-volatile memory coupled to the programmable integrated circuit. The at least one programmable integrated circuit may be programmed to perform the following designated sequence upon power on or restart of the at least one programmable integrated circuit and before booting an operating system (OS) for the local information handling system: create an inventory of hardware components that are currently installed as part of the local information handling system, compare the created inventory of hardware components of the local information handling system to a list of original manufacturer-installed hardware components for the local information handling system that is previously stored on the NVM of the local information handling system, and then only one of: boot the OS of the local information handling system and providing a unique identifier (UID) of the local information handling system across a network to a remote information handling system if the created inventory of hardware components is the same as the list of original manufacturer-installed hardware components, or boot the OS of the local information handling system without providing the UID of the local information handling system across the network to the remote information handling system if the created inventory of hardware components of the local information handling system is not the same as the list of original manufacturer-installed hardware components for the local information handling system. The system may further include a remote information handling system communicatively coupled by a network to the local information handling system, the remote information handling system including at least one second programmable integrated circuit coupled to a database; and where the at least one second programmable integrated circuit is programmed to receive the UID of the local information handling system from the local information handling system, and then to associate the UID of the local information handling system to a pre-existing account maintained in the database for the current end user by the remote information handling system.

DESCRIPTION OF ILLUSTRATIVE EMBODIMENTS

Figure 1:
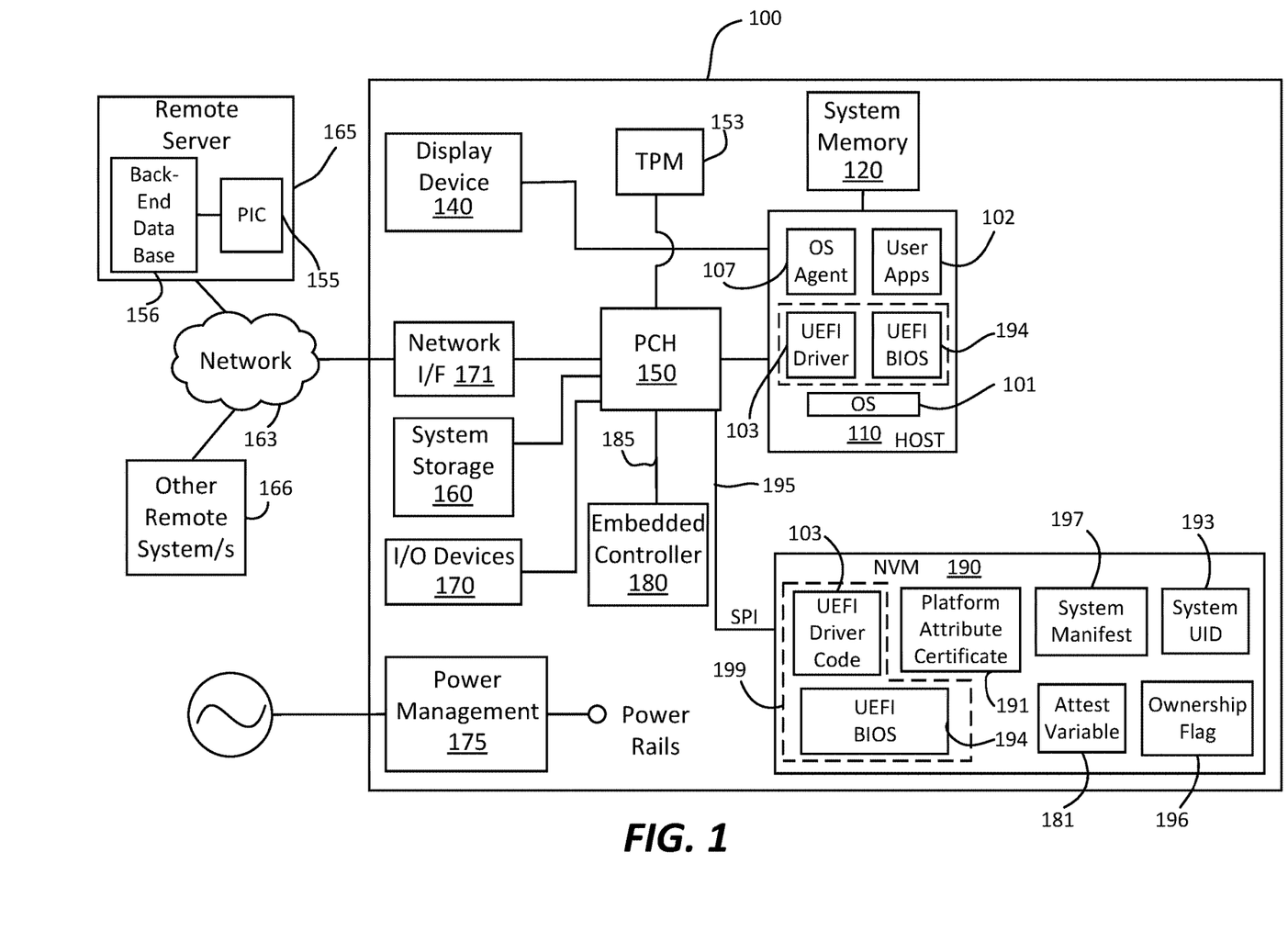
FIG. 1 illustrates a block diagram of an information handling system according to one exemplary embodiment of the disclosed systems and methods.

FIG. 1 is a block diagram of an information handling system 100 (e.g., a desktop computer, computer server, laptop computer, tablet computer, MP3 player, personal data assistant (PDA), cell phone, etc.) as it may be configured according to one embodiment of the disclosed systems and methods. In one embodiment, information handling system 100 may include a system chassis enclosure (e.g., metal and/or plastic chassis such as notebook computer case, 1U or 2U metal server case, metal or plastic desktop or tower computer case, etc.) that encloses and surrounds system various hardware components, e.g., as illustrated in FIG. 1 by the box labelled 100 that surrounds various system hardware components in in FIG. 1. It will be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may generally include a host programmable integrated circuit 110 programmed to execute an operating system (OS) 101 (e.g., such as Microsoft Windows 10, Linux OS, etc.) and BIOS 194 for system 100 (e.g., with a protected and signed persistent UEFI driver 103 that is available in the UEFI partition on non-volatile memory), along with other code such as user software applications 102 (e.g., word processing application, Internet browser, computer game, PDF viewer, spreadsheet application, etc.), a downloaded OS agent 107, etc. In FIG. 1, host programmable integrated circuit 110 may be configured to access non-volatile memory (NVM) 190 (e.g., serial peripheral interface (SPI) Flash memory) to load and boot part of a system UEFI BIOS 194 (together with UEFI driver 103) from NVM 190. Other non-volatile memory (NVM) devices may be additionally or alternatively present such as for system storage 160, e.g., including solid state drive/s (SSDs), hard drive/s, etc. Host programmable integrated circuit 110 may include any type of processing device, such as an Intel central processing unit (CPU), an Advanced Micro Devices (AMD) CPU or another programmable integrated circuit. Host programmable integrated circuit 110 is coupled to system memory 120, which may include, for example, random access memory (RAM), dynamic RAM (DRAM), synchronous DRAM (SDRAM).

In the illustrated embodiment, host programmable integrated circuit 110 of system 100 may be coupled to an external or internal (integrated) display device 140 (e.g., LCD or LED display or other suitable display device) depending on the particular configuration of information handling system 100. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system 100.

In the embodiment of FIG. 1, PCH 150 of system 100 controls certain data paths and manages information flow between components of the information handling system 100. As such, PCH 150 may include one or more integrated controllers or interfaces for controlling the data paths connecting PCH 150 with host programmable integrated circuit 110, system storage 160, input/output (I/O) devices 170 forming at least a part of a user interface for the information handling system, network interface (I/F) device (e.g., network interface controller "NIC") 171, embedded controller (EC) 180, and NVM 190 where UEFI BIOS firmware image 194 may be stored together with persistent UEFI driver code 103, as well as other code and/or data such as platform attribute certificate 191, and system component manifest 197.

In one embodiment, code for UEFI driver 103 and a Platform Attribute Certificate 191 (e.g., such as a Dell Secure Component Verification "SCV" certificate available from Dell Technologies Inc. of Round Rock, Tex.) may be provisioned (e.g., populated and stored) along with code for UEFI BIOS code 194 in a UEFI partition 199 on NVM 190 or other non-volatile memory (e.g., storage system 160) of information handling system 100 at the time of system manufacturing (e.g., during factory install "FI") and originally shipped with system 100 from the manufacturer. In one embodiment, Platform Attribute Certificate 191 lists the as-built hardware configuration (e.g., including a list such as a lookup table of originally installed hardware components) of information handling system 100, and this manufactured hardware configuration is cryptographically locked to a platform attribute certificate 191 that is a hardware certificate bound to a given information handling system 100 by a trusted platform module (TPM) 153 of system 100. System manifest 197 may be created later by UEFI driver 103 (e.g., that is executing on host programmable integrated circuit 110 during a first time boot sequence for system 100 after delivery of system 100 to an end user). Examples of original manufacturer-installed system hardware that may be listed in Platform Attribute Certificate 191 include, but are not limited to, system storage 160 (e.g., such as individual solid state drive/s, hard drive/s, etc.), optional integrated display device 140 if present (e.g., LCD display, OLED display, etc.), network interface (I/F) device (e.g., network interface controller "NIC") 171, optional GPU/s (if any), host CPU 110 (e.g., chipset), devices of system memory 120 (e.g., RAM, DRAM, SDRAM, etc.), embedded controller 180, etc.

In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface.

Also shown present in FIG. 1 is local system storage 160 (e.g., one or more media drives, such as hard disk drives, optical drives, NVRAM, Flash memory, solid state drives (SSDs), or any other suitable form of non-volatile memory) that is coupled through PCH 150 to provide non-volatile storage for information handling system 100.

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system.

In the embodiment of FIG. 1, an embedded controller (EC) 180 of system 100 is coupled to PCH 150 and may be configured to perform functions such as power/thermal system management, etc. EC 180 may also be configured to execute program instructions to boot information handling system 100, load application firmware from NVM 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.). In computer server embodiments, a baseboard management controller (BMC) may be present in the place of EC 180 to perform one or more similar functions as described above for EC 180, as well as to perform other functions specific to computer servers.

As shown in FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195 and various interface and logic blocks included within the PCH.

As further shown in FIG. 1, external and/or internal (integrated) I/O devices 170 (e.g., a keyboard, mouse, touchpad, touchscreen, etc.) may be coupled to PCH 150 of system 100 to enable the system end user to input data and interact with information handling system 100, and to interact with application programs or other software/firmware executing thereon. The network I/F device 171 may be present to enable wired and/or wireless communication with a remote server information handling system 165 (e.g., as may be maintained by the manufacturer of information handling system 100), and optionally with other remote information handling systems 166, via an external network 163 (e.g., such as the Internet), and in one embodiment may be a network interface controller (NIC) which may communicate with external network 163 across an intervening local area network (LAN), wireless LAN (WLAN), cellular network, corporate intranet, etc.

Also shown in FIG. 1, a backend database 156 may be maintained in non-volatile storage of remote server 165 and may be used for remote analysis and processing in a manner described further herein. Such remote analysis and processing may be performed using code executed by a programmable integrated circuit 155 (e.g., CPU) of remote server 165. In this regard, remote server 165 and each of remote information handling systems 166 may be configured in one embodiment with similar components and system architecture as information handling system 100.

Figure 2:
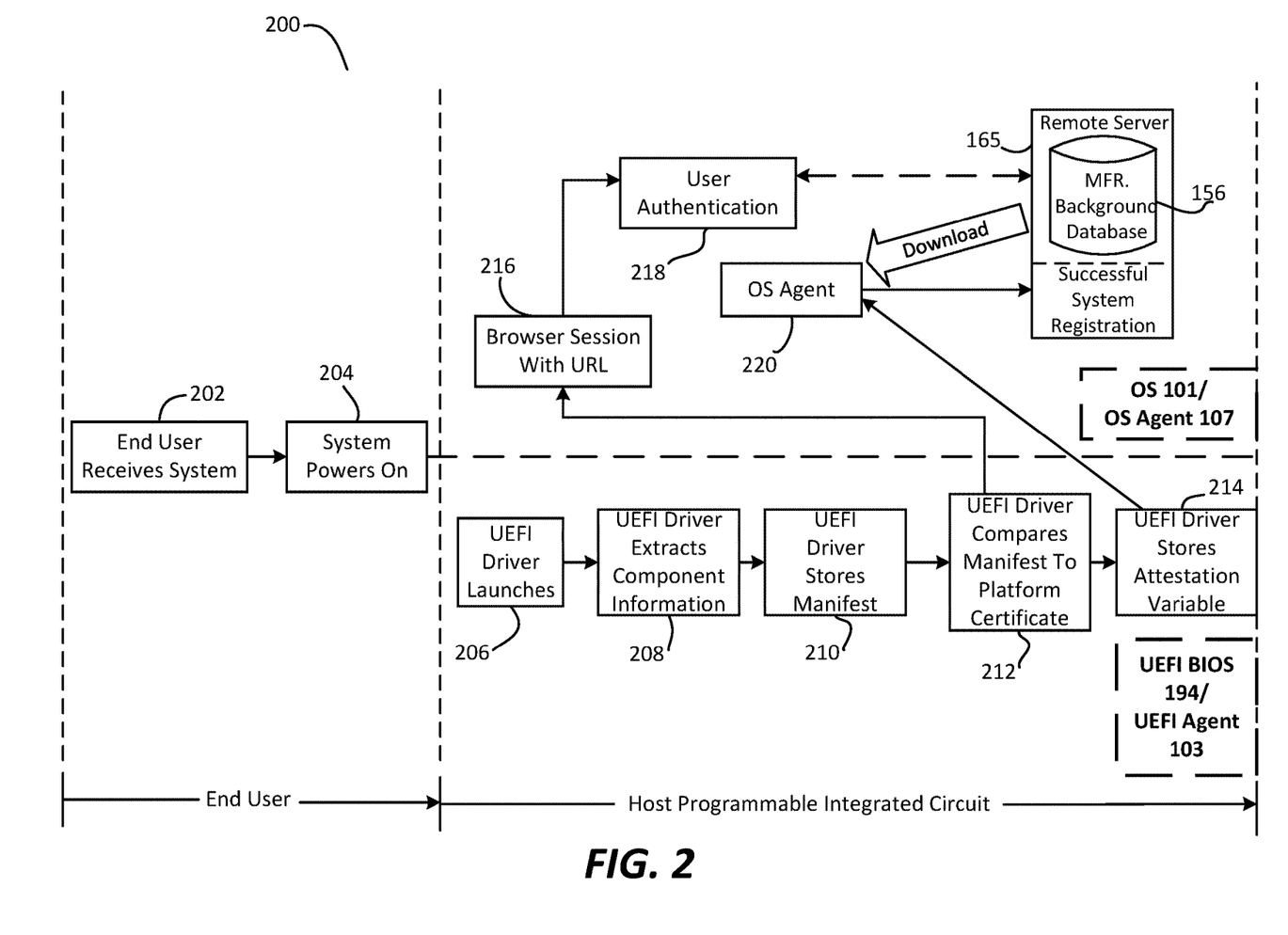
FIG. 2 illustrates methodology according to one exemplary embodiment of the disclosed systems and methods.

FIG. 2 illustrates one exemplary embodiment of a component architecture and methodology 200 as it may be implemented by host programmable integrated circuit 110 of information handling system 100 to verify the proper hardware configuration and end user ownership of a given information handling system 100 before the OS 101 of the system 100 is booted and running, and then to successfully register and associate the verified system 100 with an end user account maintained by the manufacturer of the system 100 after the OS is booted and running. As shown, methodology 200 proceeds in a sequential manner that starts with execution blocks performed by UEFI driver 103 in the boot order of the boot sequence of UEFI BIOS 194, and then proceeds after boot to OS 101 to additional execution blocks performed by OS 101 and remote server system 165.

Specifically, methodology 200 begins in block 202 where an end user initially receives information handling system 100, e.g., directly from the manufacturer of system 100, from a third party vendor, etc. The end user couples information handling system 100 in communication with network 163 and turns on system 100 for the first time in block 204, at which time system 100 powers ON for the first time since leaving the manufacturer and proceeds to the system boot sequence during which host programmable integrated circuit 110 loads UEFI BIOS 194 together with UEFI driver 103 from NVM 190.

During the boot sequence, UEFI driver (e.g., a UEFI driver module) 103 launches in block 206 and methodology 200 proceeds to block 208 where UEFI driver 103 extracts or otherwise gathers system hardware component information on system 100 and creates a system manifest 197 that includes an inventory of the type and identity of each of the connected hardware components that are currently installed as part of information handling system 100, e.g., interconnected with other information handling system components and/or contained within a chassis enclosure of system 100. Examples of such currently-installed hardware components include, but are not limited to, system storage 160 (e.g., such as individual solid state drive/s, hard drive/s, etc.), optional integrated display device 140 if present (e.g., LCD display, OLED display, etc.), network interface (I/F) device (e.g., network interface controller "NIC") 171, optional GPU/s (if any), host CPU 110, individual devices of system memory 120 (e.g., RAM, DRAM, SDRAM, etc.), embedded controller (EC) 180, etc.

In block 208, UEFI driver 103 may be programmed to create the inventory of the hardware components of system 100, e.g., using UEFI commands to retrieve system hardware information. Examples of such commands are described in UEFI Shell Specification (Revision 2.2, Jan. 26, 2016) by Unified EFI, Inc., which is incorporated herein by reference in its entirety for all purposes. In one embodiment, the resulting created system manifest 197 of block 208 may be a look-up table that includes an entry corresponding to each currently-installed and connected hardware component (e.g., device) of system 100 that is identified by the system inventory created in block 208. Each hardware device entry of system manifest 197 may in turn include device-specific information for a corresponding hardware device that is currently installed as part of system 100, e.g., such as device serial number, memory or storage size, etc. In one embodiment, UEFI driver 103 may sign the created system manifest 197 (e.g., using its private key) for security and integrity protection purposes. In block 210, UEFI driver 103 may then store the created (and optionally signed) system manifest 197 created in block 208, e.g., on NVM 190 and/or other suitable storage area such as system storage 160.

Still referring to methodology 200 of FIG. 2, UEFI driver 103 next runs attestation against the previously-stored TCG Platform Attribute Certificate 191 in block 212 by comparing the identified and extracted currently-installed hardware components of system manifest 197 to the list of original manufacturer-installed hardware components contained in Platform Attribute Certificate 191 that was stored on NVM 190 or other non-volatile memory (e.g., system storage 160) of information handling system 100 at the time of system manufacturing. Assuming that UEFI driver 103 verifies that the list of currently-installed hardware components of system manifest 197 matches (is the same as) the list of original manufacturer-installed hardware components contained in Platform Attribute Certificate 191, then attestation passes verification in block 212, and in block 214 UEFI driver 103 stores an attestation variable 181 having a value that indicates that the hardware component attestation has passed verification (e.g., as a PASS flag in NVM 190 or system storage 160). However, in the event that the hardware attestation of block 210 does not pass verification in block 212 (i.e., system manifest 197 includes additional, fewer or different hardware components than does the Platform Attribute Certificate 191) then UEFI driver 103 stores the attestation variable 181 with a value that indicates that the hardware component attestation did not pass verification (e.g., as a FAIL flag in NVM 190 or system storage 160).

Methodology 200 next proceeds with the boot process to the OS environment with OS 101 booted and running on system 100. If the system attestation passed verification in block 212, then UEFI driver 103 launches a web browser in block 216 (e.g., with a designated and pre-defined URL in the OS environment 191) which allows the end user to access remote server 165 across network 163 and in block 218 login with password or other suitable user authentication technique to their pre-existing system-manufacturer account (e.g., such as a system-manufacturer account previously created by the end user or by an IT administrator when system 100 was previously ordered from the manufacturer). The performance of this user login task in block 218 through web browser 216 may be required for user authentication purposes to ensure or verify that the end user has physically received and is in physical possession of the system 100, i.e., the end user is actually present in close physical proximity to the system 100. Once successfully logged in to their pre-existing system-manufacturer account in block 218, the end user is allowed in block 220 to download and launch operating system (OS) agent 107 for execution on system 100 as shown in FIG. 1. In another embodiment, OS agent 107 may be previously stored on system 100 and/or automatically launched in block 220.

However, if system attestation did not pass in block 212, then UEFI driver 103 does not launch the web browser in block 216 to the designated and pre-defined URL in the OS environment 191. Nor is the end user allowed in block 218 to download or otherwise load OS agent 107 for execution on system 100. Instead, one or more attestation failure steps may be taken, e.g., as described further herein with regard to the methodology of FIG. 3.

Once loaded and executing in block 220 on host programmable integrated circuit 110 of system 100, OS agent 107 reads the value of the previously-stored attestation variable 181 to determine and verify the status of the system attestation of block 212. Assuming that the attestation variable 181 has a value that indicates that the hardware component attestation of system 100 has passed verification in block 212, then OS agent 107 retrieves a manufacturer unique identifier (e.g., EC UID) 193 for the current system 100 which may be, for example, a manufacturer-assigned system service tag stored on current system 100 and that is unique to the particular machine upon which OS agent 107 is currently executing. This UID 193 may be assigned by the manufacturer at time of the system manufacture, and stored at manufacture on NVM 190 (or other non-volatile memory device of system 100). OS agent 107 then provides the UID 193 for system 100 to remote server 165, where the UID 193 for the current particular system 100 is tied to (e.g., added to) the pre-existing information already included in the current end user's pre-existing system-manufacturer account information in the system manufacturer backend database 156 that is maintained on remote server 165. In this way, the current system 100 may be registered to the end user's account (e.g., for warranty and future notification purposes) and the current end user's account information maintained in the manufacturer backend database 156 may now include both pre-existing comprehensive information about the current end user (e.g., end user name, end user employment position, end user address, etc.) along with the identity (e.g., UID 193 for the current registered system 100). At this time a flag 196 may be set in NVM 190 or other non-volatile memory (e.g., system storage 160) of system 100 to indicate that ownership by the current end user (or other one-to-one association between system 100 and the current end user) has now been established for system 100.

If for any reason, OS agent 107 determines after OS boot that attestation variable 181 is missing or has a value that indicates that the hardware component attestation of system 100 did not pass verification in block 212, then OS agent 107 may notify remote server 165 of attestation failure of the current system 100 and no registration of current system 100 with the end user's account occurs (e.g., system warranty is not valid). At this time, OS agent 107 may also notify the end user (e.g., via message displayed to the end user on system display device 140) that the current system hardware configuration does not match the original manufacturer hardware configuration of the Platform Attribute Certificate 191, and that the end user's warranty may be invalid.

Figure 3:
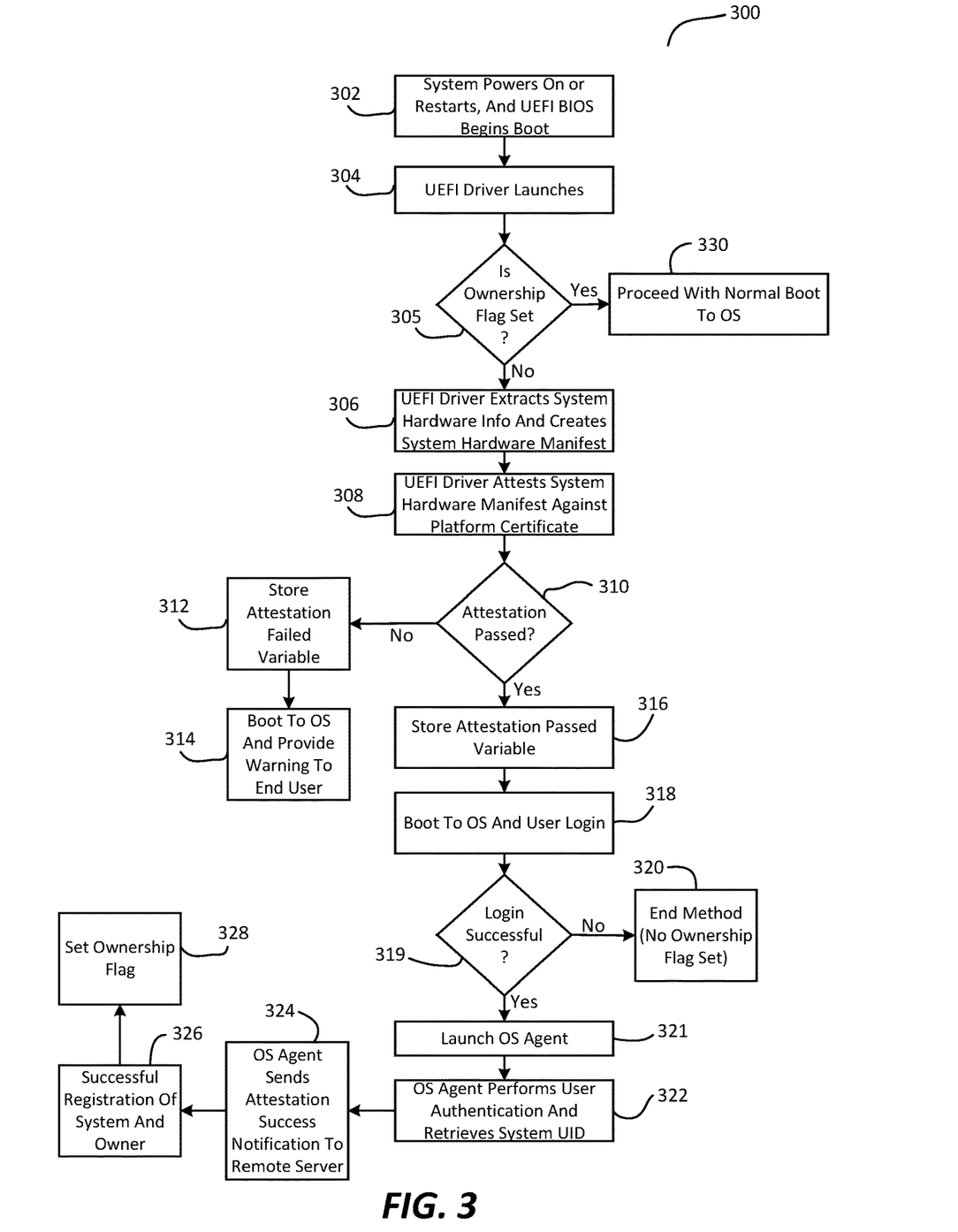
FIG. 3 illustrates methodology according to one exemplary embodiment of the disclosed systems and methods.

FIG. 3 illustrates one exemplary embodiment of a methodology 300 that may be performed in part by logic executing on a host programmable integrated circuit 110 of a given information handling system 100 to verify proper hardware configuration and end user ownership of the given system 100, and then to communicate with a remote server 165 to register and associate the verified given system 100 with an end user account maintained by the manufacturer of the system 100.

As shown in FIG. 3, methodology 300 begins in block 302 where the given system 100 is powered on or is restarted, at which time UEFI BIOS 194 loads and executes on host programmable integrated circuit 110 to begin system boot for the first time after the given system 100 is shipped from the manufacturer. During this system boot, UEFI driver (e.g., driver) 103 is launched on UEFI driver (e.g., driver) 103 in block 304, and checks in block 305 for the presence of a designated ownership flag 196 set in NVM 190 or other suitable system non-volatile memory such as system storage 160. If in block 305 ownership flag 196 is found already present on system 100, this indicates that the methodology 300 has already been performed by performing blocks 306 to 326 to successfully establish ownership and registration on backend database 156 for the current given system 100. When ownership flag 196 is found present, methodology 300 proceeds to block 330 where OS 101 is booted in normal fashion, without performing any of blocks 306 to 328.

However, if in block 305 no ownership flag 196 is found already present on system 100, then this indicates that ownership of the current system 100 has not yet been established and registration on backend database 156 has not yet been performed for the current given system 100. In this case, methodology 300 proceeds to block 306 where UEFI driver 103 extracts an inventory of the type and identity of each of the connected hardware components that are currently installed as part of information handling system 100, e.g., that are currently contained and/or interconnected within a chassis enclosure of system 100. As previously noted, examples of such currently-installed hardware components include, but are not limited to, system storage 160, optional integrated display device 140 (if present), network interface (I/F) device 171, optional GPU/s (if any), host CPU 110, individual memory devices of system memory 120, embedded controller (EC) 180, etc.

In block 306, UEFI driver 103 may also create an inventory or manifest 197 (e.g., look-up table) of the extracted currently installed hardware components of system 100 as previously described in relation to FIG. 3. In one embodiment, the resulting created system manifest 197 of block 208 may be a look-up table that includes an entry corresponding to each currently-installed hardware component (e.g., device) of system 100 that is identified by the system inventory created in block 208. Also as previously described, UEFI driver 103 may sign the created system manifest 197 (e.g., using its private key) for security and integrity protection purposes, and may then store the created (and optionally signed) system manifest 197 on NVM 190 and/or other suitable non-volatile memory such as system storage 160.

Next, in block 308, UEFI driver 103 runs an attestation of the components of manifest 197 against the previously-stored Platform Attribute Certificate 191 in block 212 by comparing the identified and extracted currently-installed hardware components of system manifest 197 to the list of original manufacturer-installed hardware components contained in Platform Attribute Certificate 191 that was stored on NVM 190 or other non-volatile memory of information handling system 100 at the time of system manufacturing. In the event that the hardware attestation of block 210 does not pass verification in block 310 (i.e., system manifest 197 includes additional, fewer or different hardware components than does the Platform Attribute Certificate 191) then in block 312 UEFI driver 103 stores the attestation variable 181 with a value that indicates that the hardware component attestation did not pass verification (e.g., as a FAIL flag in NVM 190 or system storage 160).

Following block 312, methodology 300 then proceeds with the boot process to block 314 where OS 101 is booted and OS agent 107 is launched. In this regard, OS agent 107 may be downloaded or updated across network 163 from remote server 165 (or OS agent 107 may alternatively be retrieved and launched from NVM 190, system storage 160, or other non-volatile memory of the given system 100 where it has been previously stored). Once launched, OS agent 107 may read the failed value of attestation variable 181 and respond by displaying a warning to the end user (e.g., as a text warning displayed on display device 140) that indicates that the current hardware configuration of the given system 100 does not match the original manufactured configuration and/or that the warranty for the given system 100 may not be valid. Thus, in the event that attestation fails in block 310, no registration of the given system 100 with the system manufacturer remote server 165 occurs, the given system 100 is not associated with the end user's manufacturer account, and the warranty for the given system 100 is not activated.

However, assuming that UEFI driver 103 verifies that the list of currently-installed hardware components of system manifest 197 matches (is the same as) the list of original manufacturer-installed hardware components contained in Platform Attribute Certificate 191, then attestation passes verification in block 310. Methodology 300 then proceeds to block 316. where UEFI driver 103 stores an attestation variable 181 having a value that indicates that the hardware component attestation has passed verification (e.g., as a PASS flag in NVM 190 or system storage 160). Methodology 300 then proceeds with the boot process to block 318 where OS 101 is booted, and UEFI driver 103 launches a web browser (e.g., with a designated and pre-defined URL on display device 140) which allows the end user to access remote server 165 across network 163 and to login to their pre-existing system-manufacturer account on remote server 165 (e.g., such as a system-manufacturer account previously created by the end user or by an IT administrator when system 100 was previously ordered from the manufacturer).

If user login to remote server 165 fails in block 319, then methodology 300 ends in block 320 with OS 101 booted. However, assuming a successful user login to remote server 165, methodology 300 proceeds to block 321 where OS agent 107 is then downloaded to given system 100 (or updated on system 100) across network 163 from remote server 165 and is launched on host programmable integrated circuit 110 (or OS agent 107 may alternatively be retrieved and launched from NVM 190, system storage 160, or other non-volatile memory of the given system 100 where it has been previously stored).

Once OS 101 is booted and OS agent 107 is loaded and launched in block 318, then OS agent 107 performs user authentication in block 322, and then retrieves a manufacturer unique identifier (e.g., EC UID) 193 that is unique to the current given system 100 and that is stored on NVM 190 (or other non-volatile memory device of system 100). Next in block 324, OS agent 107 sends an attestation success notification across network 163 to backend remote server 165 and provides the UID 193 for system 100 to remote server 165. Then in block 326, the programmable integrated circuit 155 of remote server 165 registers the current given system 100 and the current user, e.g., by tying or otherwise associating the UID 193 for the current particular system 100 to the current end user's pre-existing system-manufacturer account information record on backend database 156 as a registered (e.g., warranty-eligible) device. Also at this time an ownership flag 196 may be set in block 328 (e.g., on NVM 190 or other non-volatile memory of system 100) to indicate that ownership by the current end user (or other one-to-one association between system 100 and the current end user) has now been established for system 100. In this way, the current given system 100 is now registered to the end user's account (e.g., for warranty and future notification purposes) and the current end user's account information maintained in the manufacturer backend database 156 may now include both pre-existing comprehensive information about the current end user (e.g., end user name, end user employment position, end user address, etc.) along with the identity (e.g., UID 193 for the current registered system 100).

It will understood that the particular combination of tasks or functions of the blocks of FIGS. 2 and 3 are exemplary only, and that other combinations of additional and/or alternative tasks or functions may be employed that are suitable for verifying the ownership of a given information handling system by a given system user before the OS is booted and running, and then registering and/or establishing ownership of the given information handling system on a remote database.

It will also be understood that one or more of the tasks, functions, or methodologies described herein (e.g., including those described herein for components 194, 101, 102, 103, 107, 110, 155, 156, 165, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps, tasks and/or functions of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps, tasks and/or functions of the present methodologies may be employed in one or more code segments of the computer program. For example, a code segment executed by the information handling system may include one or more steps, tasks and/or functions of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising executing a host programmable integrated circuit of a local information handling system to perform the following designated sequence upon power on or restart of the host programmable integrated circuit of the local information handling system and before booting an operating system (OS) on the host programmable integrated circuit for the local information handling system:

creating an inventory of hardware components that are currently installed as part of the local information handling system;

comparing the created inventory of hardware components of the local information handling system to a list of original manufacturer-installed hardware components for the local information handling system that is previously stored on non-volatile memory (NVM) of the local information handling system; and then:
booting the OS on the host programmable integrated circuit of the local information handling system and then providing a unique identifier (UID) of the local information handling system from the local information handling system across a network to a remote information handling system if the created inventory of hardware components is the same as the list of original manufacturer-installed hardware components, and booting the OS on the host programmable integrated circuit of the local information handling system and not providing the UID of the local information handling system from the local information handling system across the network to the remote information handling system if the created inventory of hardware components of the local information handling system is not the same as the list of original manufacturer-installed hardware components for the local information handling system.

2. The method of claim 1, further comprising executing the host programmable integrated circuit of the local information handling system to provide a warning to a current end user of the local information handling system after booting the OS of the local information handling system if the created inventory of hardware components is not the same as the list of original manufacturer-installed hardware components.

3. The method of claim 1, further comprising executing the host programmable integrated circuit of the local information handling system to launch an OS agent on the host programmable integrated circuit of the local information handling system after booting the OS to retrieve the UID of the local information handling system from non-volatile memory of the local information handling system; and to provide the UID across the network to the remote information handling system if the created inventory of hardware components is the same as the list of original manufacturer-installed hardware components.

4. The method of claim 3, further comprising executing the host programmable integrated circuit of the local information handling system to only launch the OS agent after booting the OS, and only after a current end user of the local information handling system has been successfully authenticated with the remote information handling system after booting the OS.

5. The method of claim 4, further comprising executing the host programmable integrated circuit of the local information handling system to only authenticate the current end user of the local information handling system after booting the OS upon a successful login by the current end user to a pre-existing account maintained for the current end user by the remote information handling system.

6. The method of claim 1, where the list of original manufacturer-installed hardware components comprises a manufactured hardware configuration that is cryptographically locked to a platform attribute certificate bound to the local information handling system.

7. The method of claim 1, where the created inventory of hardware components comprises a signed manifest of hardware components.

8. The method of claim 1, further comprising receiving the UID of the local information handling system in the remote information handling system; and then executing a programmable integrated circuit of the remote information handling system to associate the UID of the local information handling system to a pre-existing account maintained in a stored database for the current end user by the remote information handling system.

9. The method of claim 1, where the local information handling system is a personal computer, tablet computer, or smart phone; where the host programmable integrated circuit of the local information handling system is a central processing unit (CPU); and where the method further comprises:
   executing a unified extensible firmware interface (UEFI) driver on the host programmable integrated circuit of the local information handling system to perform each of the creating of the inventory of hardware components, comparing the created inventory of hardware components, and booting the OS of the local information handling system; and
   executing an OS agent on the host programmable integrated circuit of the local information handling system to perform: the providing the unique identifier (UID) of the local information handling system from the local information handling system across the network to the remote information handling system if the created inventory of hardware components is the same as the list of original manufacturer-installed hardware components, and the not providing the UID of the local information handling system from the local information handling system across the network to the remote information handling system if the created inventory of hardware components of the local information handling system is not the same as the list of original manufacturer-installed hardware components.

10. The method of claim 1, further comprising only executing the host programmable integrated circuit of the local information handling system to perform the creating of the inventory of hardware components and comparing the created inventory of hardware components during the first time that the local information handling system is powered on after the local information handling system is shipped from its manufacturer.

11. A method, comprising performing the following designated sequence upon power on or restart of at least one programmable integrated circuit of a local information handling system and before booting an operating system (OS) for the local information handling system:
   creating an inventory of hardware components that are currently installed as part of the local information handling system;
   comparing the created inventory of hardware components of the local information handling system to a list of original manufacturer-installed hardware components for the local information handling system that is previously stored on non-volatile memory (NVM) of the local information handling system; and
   then only one of:
      booting the OS of the local information handling system and providing a unique identifier (UID) of the local information handling system across a network to a remote information handling system if the created inventory of hardware components is the same as the list of original manufacturer-installed hardware components, or
      booting the OS of the local information handling system without providing the UID of the local information handling system across the network to the remote information handling system if the created inventory of hardware components of the local information handling system is not the same as the list of original manufacturer-installed hardware components for the local information handling system;
   where the method further comprises setting a designated flag in non-volatile memory of the local information handling system only when the created inventory of hardware components is the same as the list of original manufacturer-installed hardware components, and only when the UID of the local information handling system is provided across the network to the remote information handling system after the created inventory of hardware components is determined to be the same as the list of original manufacturer-installed hardware components.

12. The method of claim 11, further comprising:
   determining whether the designated flag is present in non-volatile memory of the local information handling system before again performing the designated sequence upon a future power on or re-booting of the local information handling system; and
   then only one of:
      again performing the designated sequence if the designated flag is determined not to be present in non-volatile memory of the local information handling system, or
      booting the OS of the local information handling system without again performing the designated sequence if the designated flag is determined to be present in non-volatile memory of the local information handling system.

13. A local information handling system, comprising:
   a host programmable integrated circuit; and
   non-volatile memory coupled to the programmable integrated circuit;
   where the host programmable integrated circuit is programmed to perform the following designated sequence upon power on or restart of the host programmable integrated circuit of the local information handling system and before booting an operating system (OS) on the host programmable integrated circuit for the local information handling system:
      create an inventory of hardware components that are currently installed as part of the local information handling system,
      compare the created inventory of hardware components of the local information handling system to a list of original manufacturer-installed hardware components for the local information handling system that is previously stored on the NVM of the local information handling system, and
   then:
      boot the OS on the host programmable integrated circuit of the local information handling system and then providing a unique identifier (UID) of the local information handling system from the local information handling system across a network to a remote information handling system if the created inventory of hardware components is the same as the list of original manufacturer-installed hardware components, and boot the OS on the host programmable integrated circuit of the local information handling system and not providing the UID of the local information handling system from the local information handling system across the network to the remote information handling system if the created inventory of hardware components of the local information handling system is not the same as the list of original manufacturer-installed hardware components for the local information handling system.

14. The local information handling system of claim 13, where the host programmable integrated circuit of the local information handling system is programmed to provide a warning to a current end user of the local information handling system after booting the OS of the local information handling system if the created inventory of hardware components is not the same as the list of original manufacturer-installed hardware components.

15. The local information handling system of claim 13, where the host programmable integrated circuit of the local information handling system is programmed to launch an OS agent on the host programmable integrated circuit of the local information handling system after booting the OS to retrieve the UID of the local information handling system from non-volatile memory of the local information handling system; and to provide the UID across the network to the remote information handling system if the created inventory of hardware components is the same as the list of original manufacturer-installed hardware components.

16. The local information handling system of claim 15, where the host programmable integrated circuit of the local information handling system is programmed to only launch the OS agent after booting the OS, and only after a current end user of the local information handling system has been successfully authenticated with the remote information handling system after booting the OS.

17. The local information handling system of claim 16, where the host programmable integrated circuit of the local information handling system is programmed to only authenticate the current end user of the local information handling system after booting the OS upon a successful login by the current end user to a pre-existing account maintained for the current end user by the remote information handling system.

18. The local information handling system of claim 13, where the list of original manufacturer-installed hardware components comprises a manufactured hardware configuration that is cryptographically locked to a platform attribute certificate bound to the local information handling system.

19. The local information handling system of claim 13, where the created inventory of hardware components comprises a signed manifest of hardware components.

20. A local information handling system, comprising:
at least one programmable integrated circuit; and
non-volatile memory coupled to the programmable integrated circuit;
where the at least one programmable integrated circuit is programmed to perform the following designated sequence upon power on or restart of the at least one programmable integrated circuit and before booting an operating system (OS) for the local information handling system:
create an inventory of hardware components that are currently installed as part of the local information handling system, compare the created inventory of hardware components of the local information handling system to a list of original manufacturer-installed hardware components for the local information handling system that is previously stored on the NVM of the local information handling system, and then only one of:
boot the OS of the local information handling system and providing a unique identifier (UID) of the local information handling system across a network to a remote information handling system if the created inventory of hardware components is the same as the list of original manufacturer-installed hardware components, or boot the OS of the local information handling system without providing the UID of the local information handling system across the network to the remote information handling system if the created inventory of hardware components of the local information handling system is not the same as the list of original manufacturer-installed hardware components for the local information handling system; and where the at least one programmable integrated circuit is programmed to set a designated flag in non-volatile memory of the local information handling system only when the created inventory of hardware components is the same as the list of original manufacturer-installed hardware components, and only when the UID of the local information handling system is provided across the network to the remote information handling system after the created inventory of hardware components is determined to be the same as the list of original manufacturer-installed hardware components.

21. The local information handling system of claim 20, where the at least one programmable integrated circuit is programmed to:
determine whether the designated flag is present in non-volatile memory of the local information handling system before again performing the designated sequence upon a future power on or re-booting of the local information handling system; and
then only one of:
again perform the designated sequence if the designated flag is determined not to be present in non-volatile memory of the local information handling system, or
boot the OS of the local information handling system without again performing the designated sequence if the designated flag is determined to be present in non-volatile memory of the local information handling system.

22. A system comprising a local information handling system, the local information handling system comprising:
a host programmable integrated circuit; and
non-volatile memory coupled to the programmable integrated circuit;
where the host programmable integrated circuit is programmed to perform the following designated sequence upon power on or restart of the host programmable integrated circuit of the local information handling system and before booting an operating system (OS) on the host programmable integrated circuit for the local information handling system:
create an inventory of hardware components that are currently installed as part of the local information handling system, compare the created inventory of hardware components of the local information handling system to a list of original manufacturer-installed hardware components for the local information handling system that is previously stored on the NVM of the local information handling system, and then:

boot the OS on the host programmable integrated circuit of the local information handling system and then providing a unique identifier (UID) of the local information handling system from the local information handling system across a network to a remote information handling system if the created inventory of hardware components is the same as the list of original manufacturer-installed hardware components, and boot the OS on the host programmable integrated circuit of the local information handling system and not providing the UID of the local information handling system from the local information handling system across the network to the remote information handling system if the created inventory of hardware components of the local information handling system is not the same as the list of original manufacturer-installed hardware components for the local information handling system; and where the system further comprises a remote information handling system communicatively coupled by a network to the local information handling system, the remote information handling system comprising at least one second programmable integrated circuit coupled to a database; and where the at least one second programmable integrated circuit is programmed to receive the UID of the local information handling system from the local information handling system, and then to associate the UID of the local information handling system to a pre-existing account maintained in the database for the current end user by the remote information handling system.

23. A system comprising a local information handling system, the local information handling system comprising:

at least one programmable integrated circuit; and non-volatile memory coupled to the programmable integrated circuit;

where the at least one programmable integrated circuit is programmed to perform the following designated sequence upon power on or restart of the at least one programmable integrated circuit and before booting an operating system (OS) for the local information handling system:

create an inventory of hardware components that are currently installed as part of the local information handling system, compare the created inventory of hardware components of the local information handling system to a list of original manufacturer-installed hardware components for the local information handling system that is previously stored on the NVM of the local information handling system, and then only one of:

boot the OS of the local information handling system and providing a unique identifier (UID) of the local information handling system across a network to a remote information handling system if the created inventory of hardware components is the same as the list of original manufacturer-installed hardware components, or boot the OS of the local information handling system without providing the UID of the local information handling system across the network to the remote information handling system if the created inventory of hardware components of the local information handling system is not the same as the list of original manufacturer-installed hardware components for the local information handling system;

where the system further comprises a remote information handling system communicatively coupled by a network to the local information handling system, the remote information handling system comprising at least one second programmable integrated circuit coupled to a database; and where the at least one second programmable integrated circuit is programmed to receive the UID of the local information handling system from the local information handling system, and then to associate the UID of the local information handling system to a pre-existing account maintained in the database for the current end user by the remote information handling system; and where the at least one programmable integrated circuit is programmed to set a designated flag in non-volatile memory of the local information handling system only when the created inventory of hardware components is the same as the list of original manufacturer-installed hardware components, and only when the UID of the local information handling system is provided across the network to the remote information handling system after the created inventory of hardware components is determined to be the same as the list of original manufacturer-installed hardware components.

* * * * *